United States Patent [19]

Vamvakas

[11] 4,228,887

[45] Oct. 21, 1980

[54] ROTARY BOTTLE DISCHARGE APPARATUS

[75] Inventor: Michael Vamvakas, Rocky River, Ohio

[73] Assignee: Niagara Bottle Washer Manufacturing Co., Cleveland, Ohio

[21] Appl. No.: 21,622

[22] Filed: Mar. 19, 1979

[51] Int. Cl.$^3$ .............................................. B65G 29/00

[52] U.S. Cl. .................................... 198/408; 198/450; 198/480

[58] Field of Search ............... 198/408, 426, 432, 450, 198/480, 481, 835, 803, 620

[56] References Cited

U.S. PATENT DOCUMENTS

| | | | |
|---|---|---|---|
| 2,858,929 | 11/1958 | Vamvakas | 198/408 |
| 2,940,586 | 6/1960 | Vamvakas | 198/835 X |
| 3,517,793 | 6/1970 | Bocker | 198/408 |
| 3,603,449 | 9/1971 | Show | 198/620 |
| 4,122,937 | 10/1978 | Vischer | 198/426 X |

*Primary Examiner*—Robert B. Reeves

*Assistant Examiner*—Douglas D. Watts

*Attorney, Agent, or Firm*—Baldwin, Egan, Walling & Fetzer

[57] ABSTRACT

Cleaned bottles, as from a bottle washing machine, travel along a path carried by conveyor in a predetermined orientation evenly spaced, one bottle from another. The carrier moves the bottles from a generally horizontal position to a position approaching the vertical at which time the bottle will slide out of its usual receptacle. At the bottle discharge point, a rotatable generally helical structure is provided made of spaced rods and this device carries one or more shoes, each shoe arriving at the specified point in time with the discharge of a given bottle from the arrangement of bottles in the bottle carrier. Guided by the shoe, the bottle then is lowered by the helical structure to land in an upright position on a receiving platform. The generally helical structure is so arranged that after a bottle is deposited on its platform, the rod structure, or similar structure pushes the bottle outwardly away from the machine onto its receiving conveyor.

4 Claims, 4 Drawing Figures

ROTARY BOTTLE DISCHARGE APPARATUS

BACKGROUND OF THE INVENTION

This invention relates in general to the art of bottle washinging and particularly to the discharge of such bottles in large numbers after they are cleaned in the washer apparatus. In this invention, the bottles are carried in a predetermined arrangement evenly spaced in a carrier frame and, as the bottles are discharged by gravity from such frame, they strike at their bottom end against a rotating carrier which gently guides them through a curved path down to a location where the bottle strikes a receiving platform after which the carrier apparatus pushes the bottle away from it onto a receiving conveyor.

SUMMARY OF THE INVENTION

This invention teaches the handling of large numbers of clean bottles by bringing them along a path traveling from a generally horizontal position of the bottles to a generally vertical position, making sure that the bottles remain in the carrier receptacle until they arrive at a discharge point. At this point, the bottles fall out by gravity one at a time where they are met by a rotating carrier which is rotated in time with the spacing of the bottles as they discharge from the incoming apparatus. The bottles then are lowered by generally parallel rods on each side of each bottle until they arrive at a vertical position opposite the axis of rotation of the last named carrier after which the apparatus pushes the bottle away from it on to a receiving conveyor.

An object of the present invention therefore is to handle large numbers of clean bottles quickly by mechanical means while handling the bottles in such a manner that they are not broken and so that they are delivered in an orderly fashion to a receiving platform from which they can be removed for further use.

Other objects and advantages of the invention will be apparent from the following description taken in conjunction with the accompanying drawings, wherein:

BRIEF DESCRIPTION OF THE DRAWINGS

FIG. 3 is a sectional view taken along the line 3—3 of FIG. 1; while

DESCRIPTION OF PREFERRED EMBODIMENTS

Figure 1:
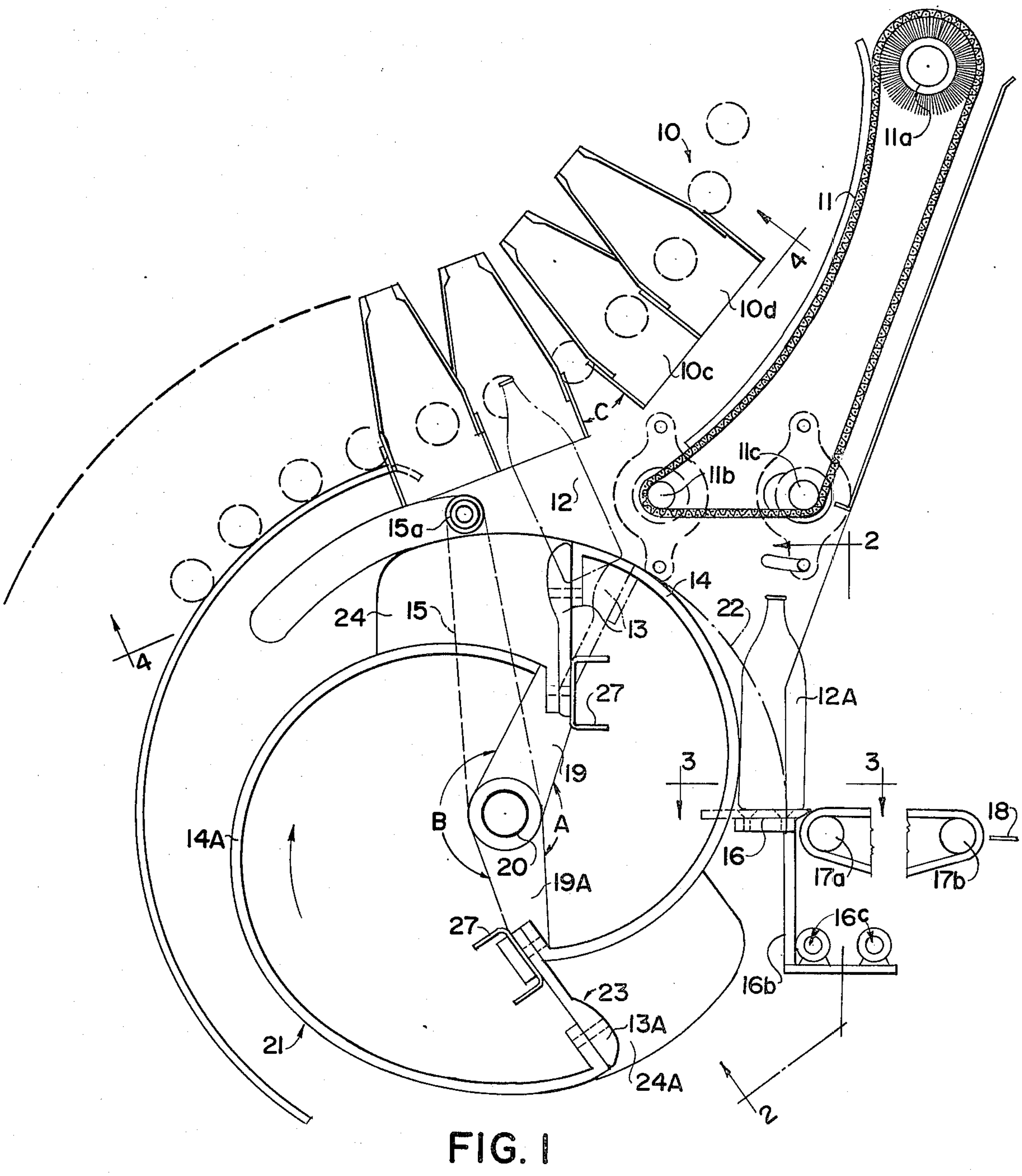
FIG. 1 is a view generally in a vertical plane taken through the apparatus of this invention.
Figure 4:
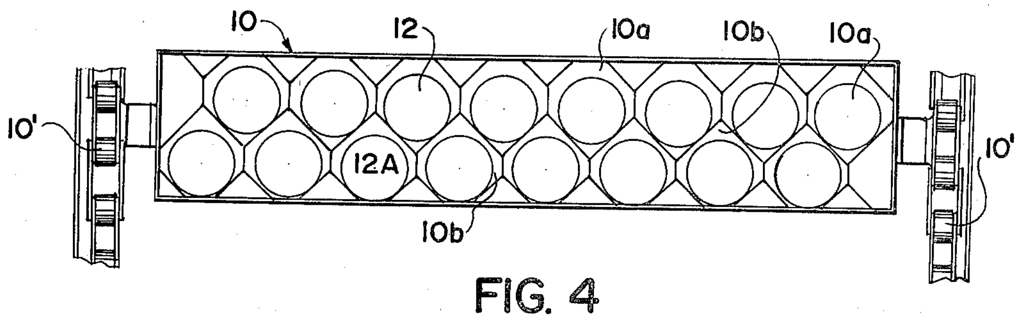
FIG. 4 is an elevational view taken along the line 4—4 of FIG. 1 showing the carrier frame for the clean bottles in the transportation conveyor.

The transporting apparatus 10 comprises parallel transporting chains 10' which carry a series of double row receptable structures as shown in FIGS. 1 and 4. This comprises a plurality, in this case eight double row groups, of which first row receptacles 10*a* are each of a size to receive a single bottle and which are evenly spaced on parallel axes very closely together as seen in FIG. 4. Each of these groups 10*a*, 10*b* includes a second row of bottle receptacles 10*b*, parallel to the first row, being the same number as in row 10*a* and spaced evenly like the first row, offset to one side, as to the left as seen in FIG. 4 by half the spacing of the first row of receptacles. This arrangement provides a very compact structure for the sixteen bottles shown in FIG. 4.

The clean bottles 10*a*, 10*b*, as they arrive at the structure of this invention, are in a generally horizontal position with one end of each carrier receptacle open toward the right as seen in FIG. 1 and all ending at a common face. Means are provided for retrining the bottles in the proper position, each in its own receptacle, as shown at 11 in FIG. 1. This is an endless open mesh wire conveyor traveling around a drive pulley 11*a* equipped with radially extending wires to engage the belt and drive it in a resilient manner. The belt then travels downwardly and toward the left as seen in FIG. 1 around an idler pulley 11*b* and then around a tightening pulley 11*c*.

Figure 2:
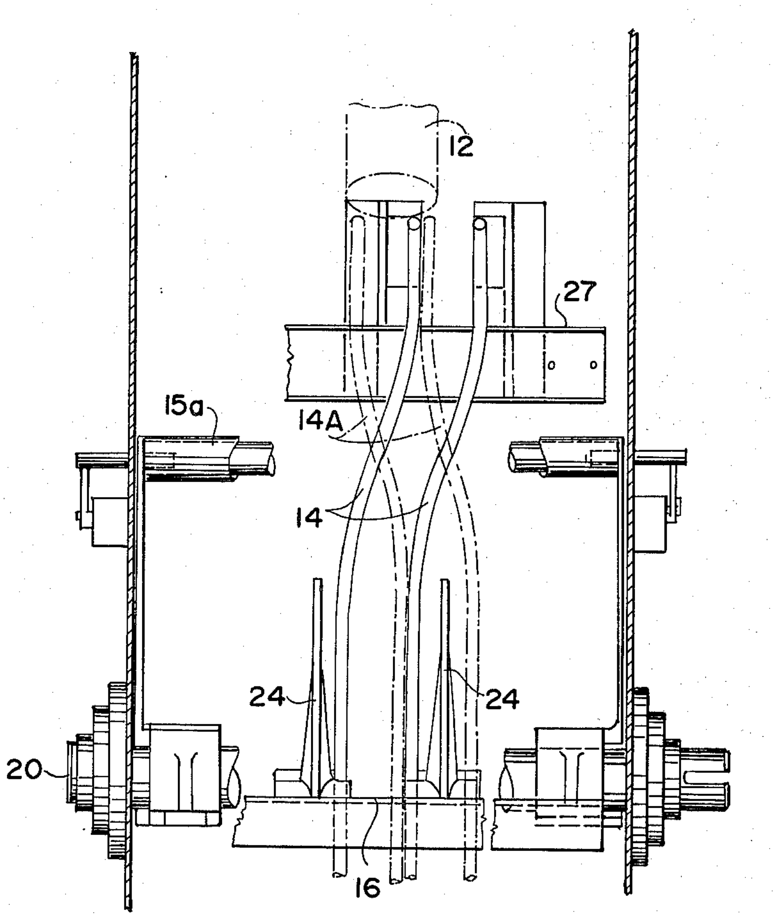
FIG. 2 is an elevational view taken along the line 2—2 of FIG. 1.

As seen in FIG. 1, the transportation conveyor turns from the generally horizontal position of the bottles as just described to turn the bottles into a generally vertical position at a discharge zone as indicated by the bottle 12 in FIG. 1. At this point each bottle is freed from the conveyor 11 and is free to fall vertically or almost vertically out of its accompanying receptacle. At this zone, each bottle is met with a rotating structure illustrated at the bottom of FIG. 1. This structure is clearly shown in FIGS. 1, 2 and 3. Two shoes 13 and 13A are shown rigidly mounted on generally helically bent rods, or other curved guide members, 14 and 14A supported by arms 19 and 19A from a drive shaft 20. All shoes 13, and all shoes 13A are rigidly connected across the machine by channels 27. The shaft 20 is rotated in a clockwise direction in FIG. 1 and is timed to coincide with the bottles as they are discharged from the receptacles 10*a* and 10*b* respectively at the discharge zone. This circumferential spacing indicated at A in FIG. 1 represents the distance between two associated bottle receivers 10 and 10*b*, while the circumferential spacing B of the arms 19 represents the space between adjacent group carriers of double row bottle receptacles as is shown at C in FIG. 1. The shoe 13 or 13A is a rigid part of the rotary carrier member 21 which includes two parallel side pieces 24 or 24A spaced apart by a little more than the width of the bottom of a bottle and extending well up the sides of the bottle. It should be understood that the rods 14 for one of the carriers receiving a bottle from a receptacle 10*a* of the transportation carrier are curved laterally in one direction from the lower ends of the rods 14 as seen in FIG. 2 and upwardly to the point where the bottle hits the structure. The other rods 14A receiving a bottle from a receptacle 10*b* are curved laterally in the opposite direction as shown in FIG. 2 by the same distance as the spacing between two receptacle areas 10*a* and 10*b* so as to carry all of the bottles from such associated receptacles to a single spot at the platform 16 as shown in FIGS. 1 and 2.

After a bottle strikes a shoe 13 or 13A as shown in FIG. 1, it continues to move around the rod guide bars 14 or 14A until it comes to the receiving platform 16. This platform has openings as shown at 16*a* in FIG. 3, which are of sufficient width to permit the carrier 21 to carry the shoes 13 or 13A through the opening 16*a* thus depositing the bottle vertically upward as shown at 12A in FIG. 1.

Figure 3:
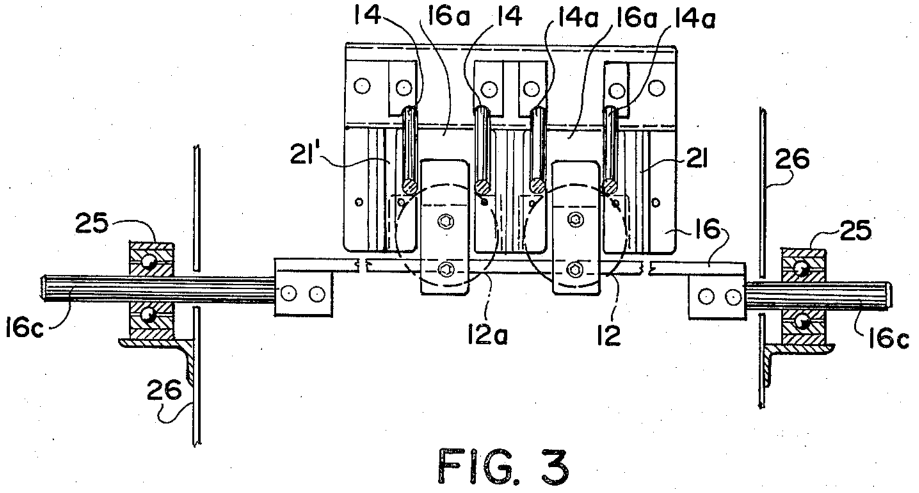

As seen in FIGS. 1 and 3, the platform 16 which extends across the entire row of bottles, (sixteen in this case) has a downwardly extending structure 16*b* which has laterally extending horizontal pins 16*c* at opposite ends, passing through friction-reducing bearings 25 which are suitably mounted in a fixed portion 26 of the machine frame. Thus when the laterally curved portions of rods 14 pass easily through closely associated openings in platform 16, they will push the platform laterally in one direction, and a few moments later the curved portions of rods 14A will push the platform in the opposite direction. These lateral pushes of platform 16 are equal to the offset between the bottles 10*a* and 10*b* in FIG. 4, so that eight rows of bottles will appear on platform 16.

In FIG. 1 there is shown an arm 15 which is mounted to oscillate about the shaft 20 and is urged toward the right as seen in FIG. 1 by a spring not shown. This is one of two spaced arms which carry between them a safety bar 15*a* against which the top of the bottle strikes as it leaves the transportation conveyor to enter the rotating discharging device shown in FIG. 1.

The dot-dash line 22 shown in FIG. 1 shows the path of travel of a portion of the rod structure 14 after the bottle is deposited in the position shown at 12'. This causes the bottle to be moved away from the rotating structure 14, 14A and on to a receiving conveyor 17. This is an endless conveyor mounted on shafts 17*a* and 17*b* and driven in the proper direction by means not shown. This is a continuous conveyor which moves very rapidly, and, in efficient operation of the apparatus, one bottle is pushed onto the take-away conveyor 18 running at right angles to the conveyor 17, when another bottle is half way between the conveyor place 17*a* and 17*b*, while a third bottle is just received on the receiving platform 16.

It will be noted that each of the shoes 13 and 13' is so shaped as indicated at 23 in FIG. 1, so as to tilt a bottle top radially inwardly as it moves down the curve from the point where the bottle is received from the transportation conveyor to the point where the bottle is deposited vertically erect on the platform 16.

It should be understood that the word "rods" applied to members 14 and 14A would also cover curved wires or castings used in the same location.

What is claimed is:

1. A bottle discharge apparatus using a carrier for empty bottles which provides plural linear rows of regularly spaced bottle receptacles moved by parallel link chains, one attached at each end of said row, said row of receptacles opening at a common face, said carrier moving in a path from a generally horizontal portion with all of said bottles lying on their sides to a generally vertical portion where said bottles are turned bottom downward nearly vertical with said common faces downward when said bottles reach a critical zone, means for holding said bottles in said receptacles up to said critical zone, means for receiving said bottles individually at said critical zone as they fall out of said receptacles, said receiving means timed relative to said carrier to cause said receiving means to be in position to accept each bottle as it slides out of its receptacle, a single fixed horizontal pad for each pair of associated bottle receptacles below and laterally outside of said critical zone, each receiving means having two portions, one portion curving laterally by an amount equal to one-half the spacing of associated bottle receptacles in one direction from said pad location up to said critical zone, the other portion of each receiving means curving laterally in the opposite direction by the same amount from said pad location up to said critical zone, said receiving means portions carrying said bottles independently to said single horizontal pad, and means at said pad to remove each bottle from its receiving means.

2. A bottle discharge apparatus as defined in claim 1, wherein said means for holding said bottles in said receptacles comprises a continuous wire mesh belt spaced from and parallel to said common face along said generally horizontal portion of said path and traveling over pulleys and guides providing a predetermined space for bottle movement relative to said carrier.

3. A bottle discharge apparatus as defined in claim 1, wherein said means for receiving said bottles individually at said critical zone comprises a generally circular wire slide member rotatably mounted on a horizontal shaft spaced beneath said critical zone, said slide member having a pair of generally parallel curved wires spaced to guide a bottle between them, a bottle receiving shoe rigidly secured to the upstream end of each guide, each shoe having side walls spaced to receive a bottle between them and having a bottom wall having an open center with side ledges spaced to hold a bottom of a bottle, a receiving plate on said apparatus in position to take a bottle from each shoe as it passes, said shoe having a width to pass between said side ledges, and each slide having a shape moving radially outward after a shoe reaches said receiving plate so as to move said bottle onto said plate.

4. A bottle discharge apparatus for a bottle washing machine using an empty-bottle carrier having a repeated series of double row receptacle structures, each structure having two rows of parallel bottle receptacles including a first linear row of receptacles each of a size to receive a single bottle and which are spaced evenly on parallel axes closely together, a second linear row of receptacles of the same size as the first row and spaced evenly at the same spacing as the first row and offset laterally relatively to the receptacles of the first row by half the spacing of the first row, all of said receptacles open at a common face; said discharging apparatus comprising means for holding said bottles in said receptacles during a portion of carrier travel as said carrier changes from a generally horizontal direction toward a generally vertical direction, said means terminates at a critical zone where said receptacles are at an acute vertical angle relative to the vertical with the receptacle open face down permitting each bottle to slide downwardly, a generally circular spiral wire slide member rotatably mounted on a horizontal shaft spaced beneath said critical zone, said wire slide member being alternately arranged with a first slide radially arranged about an arc of approximately 217 degrees and with a second slide arranged about an arc of approximately 143 degrees starting upstream with respect of direction of rotation, at a point laterally offset from said first slide by half its spacing of the receptacles, and gradually moving downstream into a final position axially in line with said first slide, said slides each consisting of two parallel wires spaced to hold a wider portion of a bottle between them, a bottle receiving shoe rigidly secured to the upstream end of each slide, each shoe having side walls spaced to receive a bottle between them and having a bottom wall having an open center with side ledges spaced to hold the bottom of a bottle, said bottom shaped to tilt a bottle radially inwardly, said wire slide member positioned and timed relative to said bottle carrier so that a shoe receives each bottle as it slides out of a carrier receptacle at said critical zone, a receiving plate on said apparatus in position to take a bottle from each shoe, said shoe having a width to pass between said side ledges, and each slide having a shape moving radially outward after a shoe reaches said receiving plate so as to move said bottle onto said plate.

* * * * *